United States Patent
Qi et al.

(10) Patent No.: US 9,585,112 B2
(45) Date of Patent: Feb. 28, 2017

(54) SYSTEMS, APPARATUS AND METHODS USING SYNC BEACONS IN NEIGHBOR AWARENESS NETWORKING (NAN)

(71) Applicant: Intel IP Corporation, Santa Clara, CA (US)

(72) Inventors: Emily H. Qi, Portland, OR (US); Minyoung Park, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,870

(22) PCT Filed: Jul. 26, 2013

(86) PCT No.: PCT/US2013/052288
§ 371 (c)(1),
(2) Date: Dec. 12, 2013

(87) PCT Pub. No.: WO2014/168640
PCT Pub. Date: Oct. 16, 2014

(65) Prior Publication Data
US 2015/0139217 A1    May 21, 2015

Related U.S. Application Data

(60) Provisional application No. 61/809,988, filed on Apr. 9, 2013.

(51) Int. Cl.
*H04W 56/00*      (2009.01)
*H04W 84/10*      (2009.01)

(52) U.S. Cl.
CPC ........ *H04W 56/001* (2013.01); *H04W 56/00* (2013.01); *H04W 84/10* (2013.01)

(58) Field of Classification Search
CPC .... H04W 56/001; H04W 84/10; H04W 56/00
See application file for complete search history.

(56) References Cited

U.S. PATENT DOCUMENTS

| | | |
|---|---|---|
| 2009/0010399 A1 | 1/2009 | Kim et al. |
| 2011/0103264 A1 | 5/2011 | Wentink |
| 2012/0158839 A1 | 6/2012 | Hassan et al. |
| 2012/0315853 A1 | 12/2012 | Lambert |
| 2013/0227152 A1 | 8/2013 | Lee et al. |
| 2014/0064261 A1* | 3/2014 | Wang et al. ................... 370/338 |
| 2014/0198725 A1* | 7/2014 | Abraham ................ H04L 67/16 370/328 |
| 2014/0254513 A1* | 9/2014 | Abraham .............. H04W 8/005 370/329 |
| 2014/0302786 A1* | 10/2014 | Kasslin et al. ............... 455/41.2 |

OTHER PUBLICATIONS

International Search Report and Written Opinion received for PCT Patent Application No. PCT/US2013/052288, mailed Jan. 28, 2014, 10 pages.

* cited by examiner

*Primary Examiner* — Mohammad Anwar

(57) ABSTRACT

Techniques are disclosed using Sync Beacons in neighbor awareness networking (NAN) in wireless networks, wherein the Sync Beacon frames use Public Action frames for the Sync Beacon. Such networks include (but are not limited to) IEEE 802.11 networks.

14 Claims, 1 Drawing Sheet

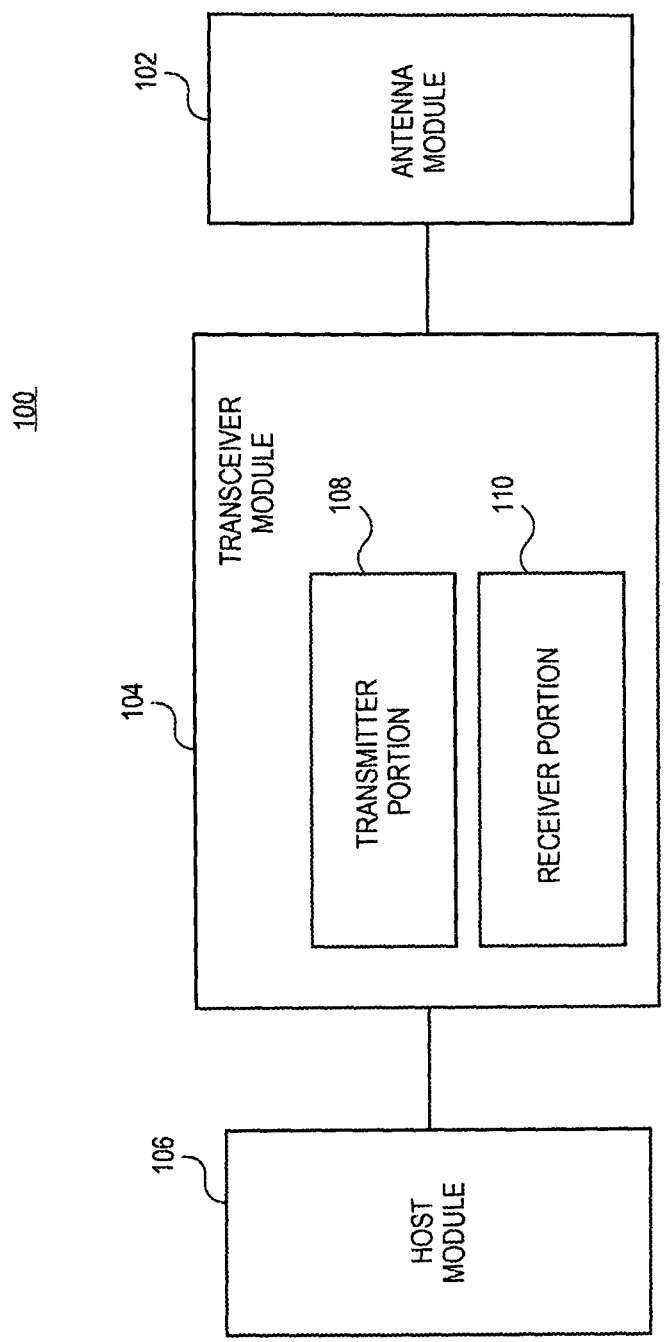

SYSTEMS, APPARATUS AND METHODS USING SYNC BEACONS IN NEIGHBOR AWARENESS NETWORKING (NAN)

RELATED CASE

This application claims priority to U.S. Provisional Patent Application No. 61/809,988, filed on 9 Apr. 2013, entitled, "SYSTEMS, APPARATUS AND METHODS. USING SYNC BEACONS IN NEIGHBOR AWARENESS NETWORKING (NAN)".

BACKGROUND

In order to keep devices in sync in Neighbor Awareness Networking (NAN), NAN devices require the transmission of a Sync Beacon.

Thus, there are general needs for improved methods of transmitting Sync Beacons by such NAN devices.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 1 is a diagram of an exemplary wireless communications device.

DETAILED DESCRIPTION

In the following description, numerous specific details are set forth. However, it is understood that embodiments of the invention may be practiced without these specific details. In other instances, well-known methods, structures and techniques have not been shown in detail in order not to obscure an understanding of this description.

References to "one, embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11 ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Problem

In order to keep devices in sync in the Neighbor Awareness Networking (NAN), NAN devices have to transmit a Sync Beacon. Suggested and existing beacon formats for sync beacons reuse the existing beacon format for a Sync Beacon. However, this will cause confusion for legacy devices operating in Neighbor Awareness Networking as legacy devices may think the NAN device is an access point (AP) and try to associate with it.

There is no prior solution for this issue. The existing, basic and straightforward approach is simply inferior to the solution provided below with respect to keeping NAN devices in sync when operating in Neighbor Awareness Networking.

Solution

To solve the problems set forth above, embodiments herein provide keeping devices in sync in Neighbor Awareness Networking (NAN), by requiring NAN devices to transmit Sync Beacons with two options for Sync Beacon frames.

Option 1: Use Public Action frame for Sync Beacons.

In the embodiment of option 1, a NAN Sync Beacon is defined as a vendor specific public action frame as defined in IEEE Standard 802.11-2012. This standard is set forth in more detail above.

Embodiments herein provide that the Action field of a NAN Sync Beacon may be included in, but are not limited to, the following fields set forth below in Table 1.

TABLE 1

General format of NAN Sync Beacon frame

| Field | Size (octets) | Value (Hexadecimal) | Description |
|---|---|---|---|
| Category | 1 | 0x04 | IEEE 802.11 public action usage. |
| Action field | 1 | 0x09 | IEEE 802.11 vendor specific usage. |
| OUI | 3 | 50 6F 9A | WFA specific OUI. |
| OUI type | 1 | 0x0?? (to be assigned) | Identifying the type or version of action frame. Setting to TBD indicates WFA NAN v1.0. |
| OUI Subtype | 1 | 0 | Identifying the type of NAN public action frame. Set to indicate Sync Beacon frame. |
| Timestamp | 8 | variable | This field represents the value of the timing synchronization function (TSF) timer of a frame's source. |
| NAN ID | 2 | variable | Identifying the identifier of NAN |
| Sync Beacon Interval | 2 | variable | Interval for transmitting the synchronization beacon. |
| Discovery Window | 2 | variable | Minimum duration that devices that need to be on to receive |

TABLE 1-continued

General format of NAN Sync Beacon frame

| Field | Size (octets) | Value (Hexadecimal) | Description |
| --- | --- | --- | --- |
| Duration Discovery Period | 4 | variable | NAN frames Interval between Discovery Windows |

In embodiments herein, Category, Action field, OUI, OUI type and OUI subtype fields are standard fields for a public action frame. However, Timestamp, NAN ID, Sync Beacon Interval, Discovery Window, Discovery Period fields are the fields designed for Sync Beacon.

Option 2: Use a new frame Subtype to define a new frame format for the Sync Beacon.

The embodiment of option 2 uses a new frame Subtype to define a new frame format for the Sync Beacon.

The format of the Sync Beacon is shown below in Table 2.

TABLE 2

General format of NAN Sync Beacon frame with new frame Subtype (FCS)

| Field | Size (octets) | Value (Hexadecimal) | Description |
| --- | --- | --- | --- |
| FC | 2 | Variable | See table 3. |
| SA | 6 | Variable | MAC address of the device transmitting Sync Beacon |
| Timestamp | 8 | variable | This field represents the value of the timing synchronization function (TSF) timer of a frame's source. |
| NAN ID | 2 | variable | Identifying the identifier of NAN |
| Sync Beacon Interval | 2 | variable | Interval for transmitting the synchronization beacon. |
| Discovery Window Duration | 2 | variable | Minimum duration that devices that need to be on to receive NAN frames |
| Discovery Period | 4 | variable | Interval between Discovery Windows |
| FCS | 4 | | |

Embodiments herein may use the type and subtype field settings for the Sync beacon as given in Table 3 below.

TABLE 3

FC field Type and Subtype setting

| Type | Subtype |
| --- | --- |
| 11 | 0010 or 0011 |

In summary, devices that implement NAN discovery benefit from embodiments described by transmitting sync beacon frames utilizing the two options set forth above: Using Public Action frame for Sync Beacon; or using a new frame Subtype to define a new frame format for the Sync Beacon.

The techniques described herein have been described in the context of IEEE 802.11 (WiFi) networks. However, embodiments are not limited to such networks.

FIG. 1 is a diagram of an implementation 100 that may be included in a wireless device, such as a STA and/or an access point. Device 100 may perform techniques, as described herein, such as using Sync Beacon frames in neighbor awareness networking (NAN) devices to enable the devices keep in sync. As shown in FIG. 4, implementation 100 may include an antenna module 102, a transceiver module 104, and a host module 106. These elements may be implemented in hardware, software, or any combination thereof.

Antenna module 102 provides for the exchange of wireless signals with remote devices. Moreover, antenna module 102 may transmit wireless signals through one or more directional radiation patterns. Thus, antenna module 102 may include multiple antennas and/or multiple radiating elements (e.g., phased-array radiating elements).

Transceiver module 104 provides an interface between antenna module 102 and host module 106. For instance, transmitter portion 108 within transceiver module 104 receives symbols from host module 106 and generates corresponding signals for wireless transmission by antenna module 102. This may involve operations, such as modulation, amplification, and/or filtering. However, other operations may be employed.

Conversely, receiver portion 110 within transceiver module 104 obtains signals received by antenna module 102 and generates corresponding symbols. In turn, receiver portion 110 provides symbols to host module 106. This generation of symbols may involve operations, including (but not limited to) demodulation, amplification, and/or filtering.

The symbols exchanged between host module 106 and transceiver module 104 may form messages or information associated with one or more protocols, and/or one or more user applications. Thus, host module 106 may perform operations corresponding to such protocol(s) and/or user application(s). Such operations may include NAN device sync operations, as described herein. Further, exemplary protocols include various media access, network, transport and/or session layer protocols. Exemplary user applications include telephony, messaging, e-mail, web browsing, content (e.g., video and audio) distribution/reception, and so forth.

In addition, host module 106 may exchange control information with transceiver module 104. This control information may pertain to the operation and status of transceiver module 104. For instance, this control information may include directives that host module 106 sends to transceiver module 104. Such directives may establish operating parameters/characteristics for transceiver module 104. Also, this control information may include data (e.g., operational status information) that host module 106 receives from transceiver module 104. It may further include transmission of Sync Beacon frames using Public Action frames for the Sync Beacon. In addition to a Category, Action field, OUI, OUI type and OUI subtype fields that are standard fields for a public action flame, Timestamp, NAN ID, Sync Beacon Interval, Discovery Window and Discovery Period fields are included and are fields designed for the Sync Beacon. The host module 104 may further provide for the transmission of Sync Beacon frames that may use a new frame subtype to define a new frame format for the Sync Beacon.

As described above, transmitter portion 108 generates signals from symbols, and receiver portion 110 generates symbols from received signals. To provide such features, transmitter portion 108 and receiver portion 110 may each include various components, such as modulators, demodulators, amplifiers, filters, buffers, upconverters, and/or downconveters. Such components may be implemented in hardware (e.g., electronics), software, or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information, according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:
1. A wireless communication device, comprising:
a host module configured to use Sync Beacon frames in neighbor awareness networking (NAN) to enable devices keep in sync, the Sync Beacon frames to use Public Action frames for the Sync Beacon, the Public Action frames to comprise at least an organizationally unique identifier (OUI) type field, an OUI subtype field, and a NAN identification (ID) field, the OUI type field to comprise a value to indicate that the Public Action frames comprise NAN Public Action frames, the OUI subtype field to comprise a value to indicate that the NAN Public Action frames comprise NAN Sync Beacon frames, the NAN ID field having a NAN identifier; and
a transmitter interfaced with the host module to transmit the Sync Beacon frames that use Public Action frames for the Sync Beacon.
2. The wireless communication device of claim 1, the Public Action frames to comprise one or more of the following fields: Timestamp, Sync Beacon Interval, Discovery Window or Discovery Period.

3. The wireless communication device of claim 2, further comprising an antenna module to exchange wireless signals, the signals to include the Sync Beacon frames using Public Action frames.
4. The wireless communication device of claim 1, the Public Action frames to comprise a Timestamp field, a Sync Beacon Interval field, a Discovery Window field, and a Discovery Period field.
5. A wireless communication device, comprising:
a host module configured to use Sync Beacon frames in neighbor awareness networking (NAN) to enable the devices keep in sync, the Sync Beacon frames to comprise at least a frame check (FC) field, a frame check sequence (FCS) field, and a NAN identification (ID) field having a NAN identifier and use a frame Subtype to define a frame format for the Sync Beacon, the FC field to comprise a type setting value of 11 and a subtype setting value of 0010 or 0011 as field settings for the Sync Beacon; and
a transmitter interfaced with the host module to transmit the Sync Beacon frames that use frame Subtype to define a frame format for the Sync Beacon.
6. The wireless communication device of claim 5, further comprising an antenna module to exchange wireless signals, the signals to include the Sync Beacon frames.
7. A method, comprising:
using Sync Beacon frames in neighbor awareness networking (NAN) devices to enable the devices keep in sync, wherein the Sync Beacon frames use Public Action frames for the Sync Beacon, the Public Action frames comprising at least an organizationally unique identifier (OUI) type field, an OUI subtype field, and a NAN identification (ID) field, the OUI type field to comprise a value to indicate that the Public Action frames comprise NAN Public Action frames, the OUI subtype field to comprise a value to indicate that the NAN Public Action frames comprise NAN Sync Beacon frames, the NAN ID field including a NAN identifier.
8. The method of claim 7, wherein the Public Action frames comprise one or more of the following fields: Timestamp, Sync Beacon Interval, Discovery Window or Discovery Period.
9. The method of claim 7, the Public Action frames comprising a Timestamp field, a Sync Beacon Interval field, a Discovery Window field, and a Discovery Period field.
10. A method, comprising:
using Sync Beacon frames in neighbor awareness networking (NAN) devices to enable the devices keep in sync, wherein the Sync Beacon frames comprise at least a frame check (FC) field, a frame check sequence (FCS) field, and a NAN identification (ID) field including a NAN identifier and use a frame Subtype to define a frame format for the Sync Beacon, the FC field to comprise a type setting value of 11 and a subtype setting value of 0010 or 0011 as field settings for the Sync Beacon.
11. A non-transitory machine readable medium storing instructions, the instructions, when executed by one or more processors to use Sync Beacon frames in neighbor awareness networking (NAN) devices to enable the devices keep in sync, the Sync Beacon frames to use Public Action frames for the Sync Beacon, the Public Action frames to comprise at least an organizationally unique identifier (OUI) type field, an OUI subtype field, and a NAN identification (ID) field, the OUI type field to comprise a value to indicate that the Public Action frames comprise NAN Public Action frames, the OUI subtype field to comprise a value to indicate that the NAN Public Action frames comprise NAN Sync Beacon frames, the NAN ID field having a NAN identifier.

12. The non-transitory machine readable medium of claim 11, the Public Action frames to comprise one or more of the following fields: Timestamp, Sync Beacon Interval, Discovery Window or Discovery Period.

13. The non-transitory machine readable medium of claim 11, the Public Action frames comprising a Timestamp field, a Sync Beacon Interval field, a Discovery Window field, and a Discovery Period field.

14. A non-transitory machine readable medium storing instructions, the instructions, when executed by one or more processors to use Sync Beacon frames in neighbor awareness networking (NAN) devices to enable the devices keep in sync, the Sync Beacon frames to comprise at least a frame check (FC) field, a frame check sequence (FCS) field, and a NAN identification (ID) field having a NAN identifier and use a frame Subtype to define a frame format for the Sync Beacon, the FC field to comprise a type setting value of 11 and a subtype setting value of 0010 or 0011 as field settings for the Sync Beacon.

\* \* \* \* \*